US012659898B2

(12) United States Patent
    Jiang

(10) Patent No.:    US 12,659,898 B2
(45) Date of Patent:        Jun. 16, 2026

(54) TIMING ADVANCE SENDING METHOD AND APPARATUS

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice:     Subject to any disclaimer, the term of this patent is extended or adjusted under 35 U.S.C. 154(b) by 292 days.

(21) Appl. No.:     18/003,730

(22) PCT Filed:     Jul. 31, 2020

(86) PCT No.:     PCT/CN2020/106274
      § 371 (c)(1),
      (2) Date:     Dec. 29, 2022

(87) PCT Pub. No.: WO2022/021353
      PCT Pub. Date: Feb. 3, 2022

(65)              Prior Publication Data
      US 2023/0276390 A1      Aug. 31, 2023

(51) Int. Cl.
      *H04W 56/00*          (2009.01)
      *H04W 84/06*          (2009.01)
(52) U.S. Cl.
      CPC ..... *H04W 56/0045* (2013.01); *H04W 56/006* (2013.01); *H04W 84/06* (2013.01)
(58) Field of Classification Search
      CPC ........... H04W 56/0045; H04W 56/006; H04W 84/06; H04W 56/00
      See application file for complete search history.

(56)              References Cited

U.S. PATENT DOCUMENTS

2019/0342000 A1     11/2019   Zheng et al.
2019/0349877 A1     11/2019   Alasti et al.
2020/0236715 A1*     7/2020   Akkarakaran .... H04W 74/0891
                              (Continued)

FOREIGN PATENT DOCUMENTS

CN          109788548   A      5/2019
CN          111263390   A      6/2020
                 (Continued)

OTHER PUBLICATIONS

Kunt et al. "Timing Advance Report for Non-Terrestrial Networks", MediaTek Singapore, U.S. Appl. No. 63/022,625, filed May 11, 2020, Total pp. 15 (Year: 2020).*
                 (Continued)

*Primary Examiner* — Shah M Rahman
(74) *Attorney, Agent, or Firm* — Volpe Koenig

(57)              ABSTRACT

A timing advance sending method and a timing advance sending apparatus that improves the efficiency of a communication network. The efficiency of the communication network is improved by sending relative timing advance to a base station, where the relative timing advance is determined based on a relationship between a distance between the terminal and a non-terrestrial network device and a distance from the network device to an earth reference point. The determined relative timing advance is relatively small in comparison with a propagation delay corresponding to all communication links between the terminal and the base station, so that a number of bits that requires to be occupied is relatively small and thus a number of bits that requires to be occupied by the terminal to report the relative timing advance is relatively small, which helps to save communication resources.

10 Claims, 3 Drawing Sheets

Send Msg3 or MsgA in a random access process to the base station, where the relative TA is carried in the Msg3 or MsgA in the random access process, the relative timing advance is determined based on a relationship between the distance from the terminal to a non-terrestrial network device and the distance from the network device to an earth reference point

~S1011

(56) References Cited

U.S. PATENT DOCUMENTS

| | | | | |
|---|---|---|---|---|
| 2021/0105761 A1* | 4/2021 | Cheng | ............... | H04W 74/0833 |
| 2021/0153193 A1* | 5/2021 | Lin | .................... | H04W 56/0045 |
| 2021/0352606 A1* | 11/2021 | Hosseinian | .......... | H04B 7/1851 |
| 2022/0015154 A1* | 1/2022 | Wu | .................... | H04W 56/0045 |
| 2022/0217782 A1* | 7/2022 | Nishio | ................. | H04B 7/1851 |
| 2022/0255620 A1* | 8/2022 | Wang | ............... | H04W 74/0833 |
| 2022/0345961 A1* | 10/2022 | Tao | ...................... | H04B 7/1851 |
| 2022/0361251 A1* | 11/2022 | Yu | ...................... | H04B 7/18513 |
| 2022/0408389 A1* | 12/2022 | Wang | ............... | H04W 56/0045 |
| 2023/0049008 A1* | 2/2023 | Nishio | ................. | H04B 7/1853 |
| 2023/0101732 A1* | 3/2023 | Nishio | .............. | H04W 56/0055 |
| | | | | 370/329 |
| 2023/0189179 A1* | 6/2023 | Kunt | ................. | H04W 56/0045 |
| 2023/0199688 A1* | 6/2023 | Wang | ............... | H04W 56/0045 |
| | | | | 370/503 |
| 2023/0224972 A1* | 7/2023 | Cheng | .................. | H04W 74/04 |
| | | | | 370/329 |
| 2023/0319822 A1* | 10/2023 | Park | ...................... | H04L 1/0003 |
| | | | | 370/329 |
| 2023/0344508 A1* | 10/2023 | Tseng | ................. | H04W 56/005 |

FOREIGN PATENT DOCUMENTS

| | | | | |
|---|---|---|---|---|
| CN | 111800851 A | 10/2020 | | |
| WO | 2019/217418 A1 | 11/2019 | | |
| WO | WO-2020221127 A1 * | 11/2020 | ........ | H04W 56/0045 |

OTHER PUBLICATIONS

ISA State Intellectual Property Office of the People's Republic of China, International Search Report Issued in Application No. PCT/CN2020/106274, Apr. 19, 2021, WIPO, 4 pages.

State Intellectual Property Office of the People's Republic of China, Office Action and Search Report Issued in Application No. 2020800016978, Jun. 10, 2022, 24 pages.(Submitted with Machine/Partial Translation).

CATT "PRACH design and UL timing advance""3GPP TSG RAN WG1 Meeting #97 R1-1906325 Reno, USA, May 13-17, 2019" May 4, 2019,7 pages.

Panasonic"Timing advance and PRACH design for NTN" "3GPP TSG RAN WG1 #99 R1-1912903 Reno, USA, Nov. 18-22, 2019" Nov. 8, 2019,13 pages.

State Intellectual Property Office of the People's Republic of China, Decision of Rejection Issued in Application No. 202080001697.8, Mar. 29, 2023, 16 pages.

ISA State Intellectual Property Office of the People's Republic of China, Written Opinion of the International Searching Authority Issued in Application No. PCT/CN2020/106274, Apr. 19, 2021, WIPO, 6 pages.

Mi Zhengkun, "Mobile Communication—Switching and Signaling", People's Post and Telecommunications Press, December, Dec. 1996, 30 pages.

* cited by examiner

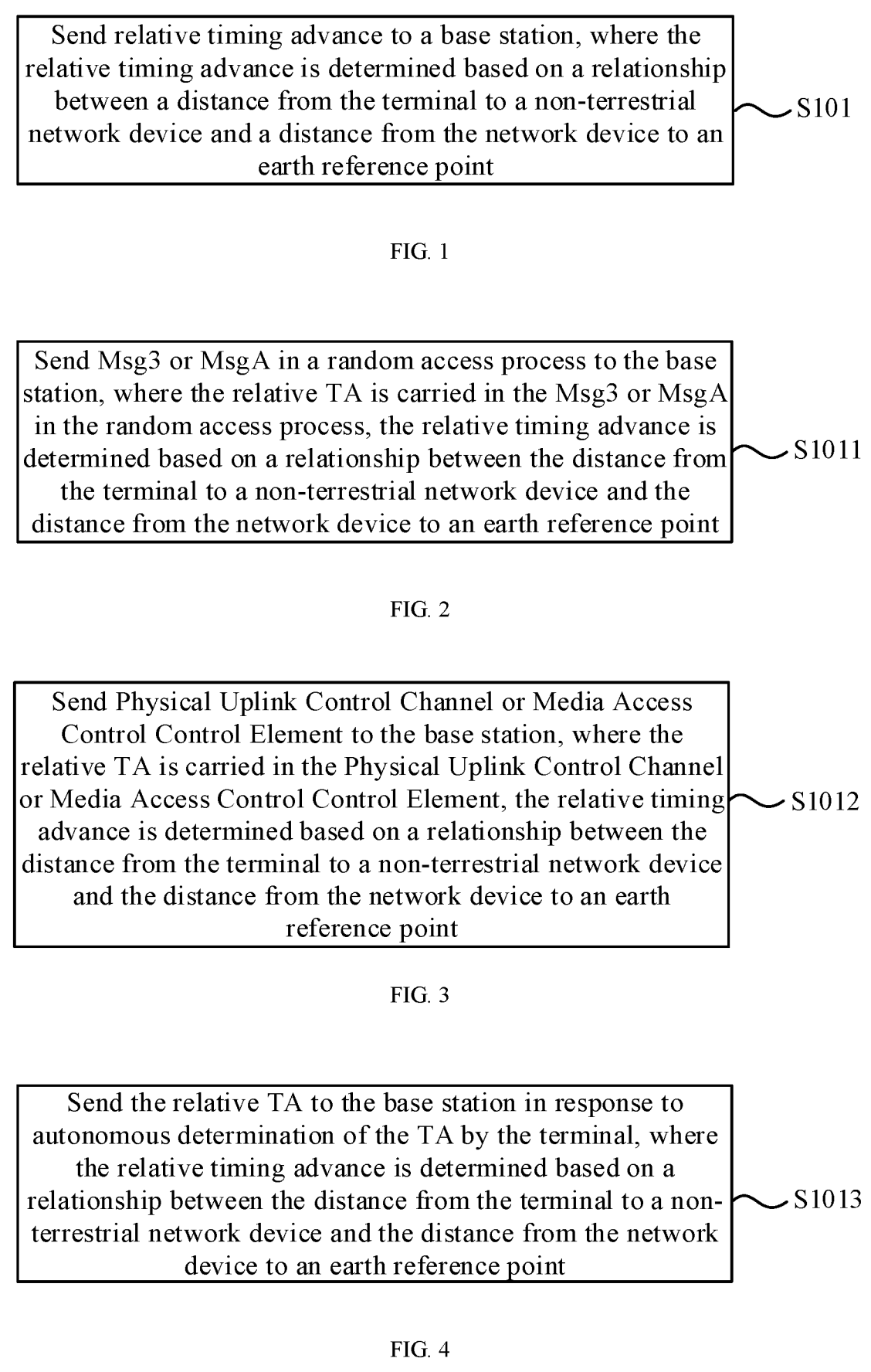

Send relative timing advance to a base station, where the relative timing advance is determined based on a relationship between a distance from the terminal to a non-terrestrial network device and a distance from the network device to an earth reference point　　～S101

FIG. 1

Send Msg3 or MsgA in a random access process to the base station, where the relative TA is carried in the Msg3 or MsgA in the random access process, the relative timing advance is determined based on a relationship between the distance from the terminal to a non-terrestrial network device and the distance from the network device to an earth reference point　　～S1011

FIG. 2

Send Physical Uplink Control Channel or Media Access Control Control Element to the base station, where the relative TA is carried in the Physical Uplink Control Channel or Media Access Control Control Element, the relative timing advance is determined based on a relationship between the distance from the terminal to a non-terrestrial network device and the distance from the network device to an earth reference point　　～S1012

FIG. 3

Send the relative TA to the base station in response to autonomous determination of the TA by the terminal, where the relative timing advance is determined based on a relationship between the distance from the terminal to a non-terrestrial network device and the distance from the network device to an earth reference point　　～S1013

FIG. 4

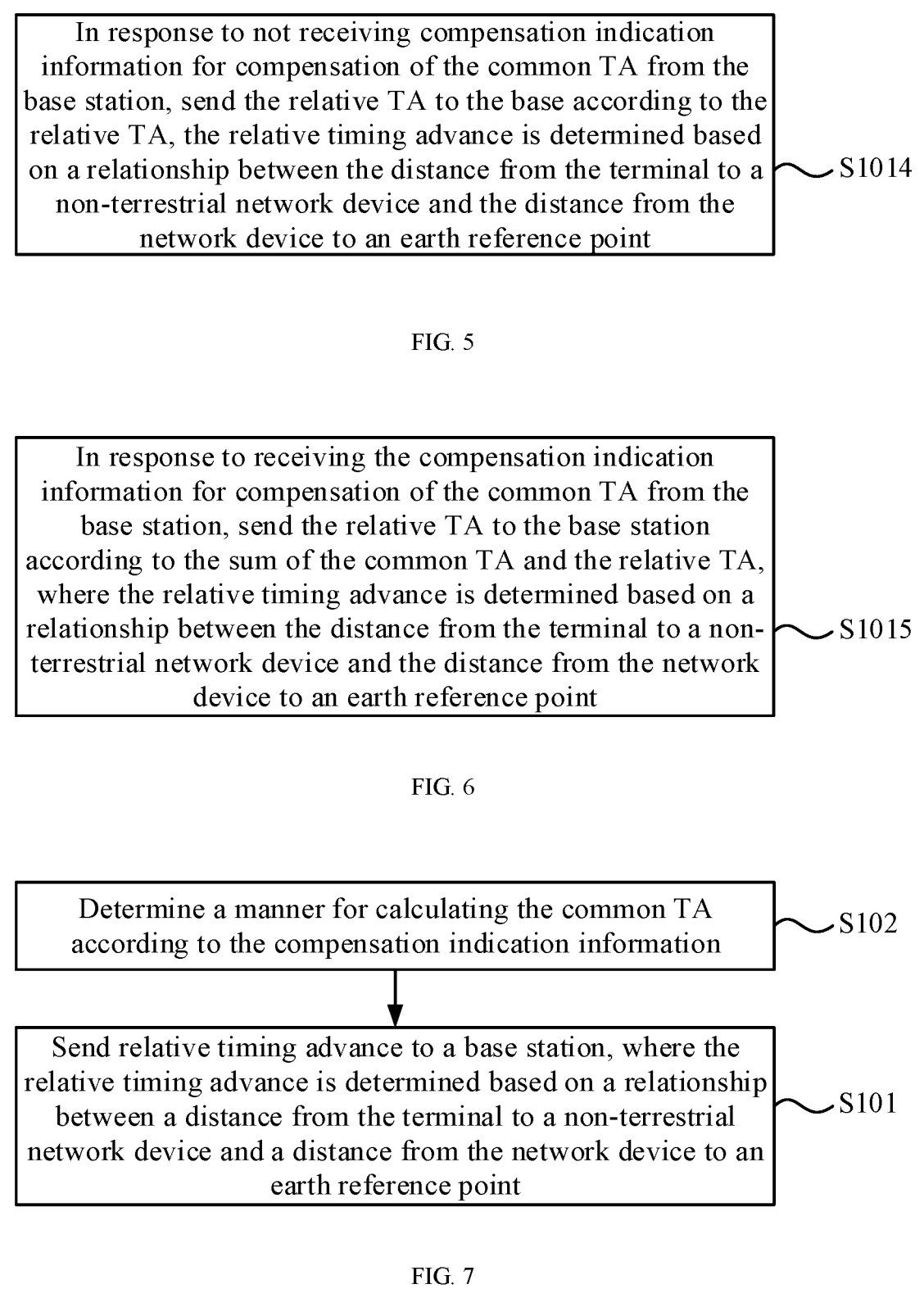

In response to not receiving compensation indication information for compensation of the common TA from the base station, send the relative TA to the base according to the relative TA, the relative timing advance is determined based on a relationship between the distance from the terminal to a non-terrestrial network device and the distance from the network device to an earth reference point ~S1014

FIG. 5

In response to receiving the compensation indication information for compensation of the common TA from the base station, send the relative TA to the base station according to the sum of the common TA and the relative TA, where the relative timing advance is determined based on a relationship between the distance from the terminal to a non-terrestrial network device and the distance from the network device to an earth reference point ~S1015

FIG. 6

Determine a manner for calculating the common TA according to the compensation indication information ~S102

Send relative timing advance to a base station, where the relative timing advance is determined based on a relationship between a distance from the terminal to a non-terrestrial network device and a distance from the network device to an earth reference point ~S101

FIG. 7

TIMING ADVANCE SENDING METHOD AND APPARATUS

CROSS REFERENCE TO RELATED APPLICATIONS

The present application is a U.S. national phase of International Application No. PCT/CN2020/106274 filed on Jul. 31, 2020, the disclosure of which is hereby incorporated by reference in its entirety for all purposes.

TECHNICAL FIELD

The present disclosure relates to the field of communication technologies, and specifically, to a timing advance sending method, a timing advance sending apparatus, an electronic device, and a computer-readable storage medium.

BACKGROUND TECHNOLOGY

With the development of communication technologies, it is necessary to satisfy the requirement that a base station/ base stations can communicate with a terrestrial terminal/ terminals at any position. However, since base stations in the current network are terrestrial, there are many restrictions on setting the base stations, and it is difficult to fully cover the earth through the terrestrial base stations, so it is considered to cover together with a satellite/satellites.

In a terrestrial network, a base station may send Timing Advance (TA) to a terminal, so as to make an uplink signal frame sent by the terminal corresponding to a downlink signal frame sent by the base station.

However, when communicating in a Non-Terrestrial Network (NTN for short) in combination with a satellite, since the satellite is non-terrestrial and moves at a high speed, a large delay may occur when the base station communicates with the terminal via the satellite, and the TA may also be large as it is set according to the delay, thereby causing certain problems.

SUMMARY

In view of the above, a timing advance sending method, a timing advance sending apparatus, an electronic device, and a computer-readable storage medium are proposed according to the embodiments of the present disclosure, so as to solve technical problems in the related art.

According to a first aspect of the present disclosure, a timing advance sending method is proposed, the method includes:

sending, by a terminal, relative timing advance to a base station, where the relative timing advance is determined based on a relationship between a distance from the terminal to a non-terrestrial network device and a distance from the network device to an earth reference point.

According to a second aspect of the present disclosure, an electronic device is proposed, including:

a processor;

a memory for storing processor-executable instructions;

where the processor is configured to send relative timing advance to a base station, wherein the relative timing advance is determined based on a relationship between a distance from a terminal to a non-terrestrial network device and a distance from the network device to an earth reference point.

According to the embodiments of the present disclosure, the timing advance reported by the terminal to the base station may not be the timing advance corresponding to a propagation delay of all communication links, but only a relative timing advance. The relative timing advance is determined based on the relationship between the distance from the terminal to the non-terrestrial network device and the distance from the network device to the earth reference point. The determined relative timing advance is relatively small in comparison with the propagation delay corresponding to all the communication links between the terminal and the base station. Therefore, a number of bits that requires to be occupied is relatively small, and a number of bits that requires to be occupied by the terminal to report the relative timing advance is thus relatively small, thereby saving communication resources.

DESCRIPTION OF DRAWINGS

In order to illustrate the technical solutions in the embodiments of the present disclosure more clearly, the drawings used for the description of the embodiments will be briefly described below. The following drawings are only certain embodiments of the present disclosure. For those of ordinary skill in the art, other drawings can be obtained from these drawings without creative labor.

FIG. 1 is a schematic flowchart of a timing advance sending method shown according to an embodiment of the present disclosure.

FIG. 2 is a schematic flowchart of another timing advance sending method shown in accordance with an embodiment of the present disclosure.

FIG. 3 is a schematic flowchart of yet another timing advance sending method shown according to an embodiment of the present disclosure.

FIG. 4 is a schematic flowchart of yet another timing advance sending method shown according to an embodiment of the present disclosure.

FIG. 5 is a schematic flowchart of yet another timing advance sending method shown according to an embodiment of the present disclosure.

FIG. 6 is a schematic flowchart of yet another timing advance sending method shown according to an embodiment of the present disclosure.

FIG. 7 is a schematic flowchart of yet another timing advance sending method shown according to an embodiment of the present disclosure.

DETAILED DESCRIPTION

Figure 8:
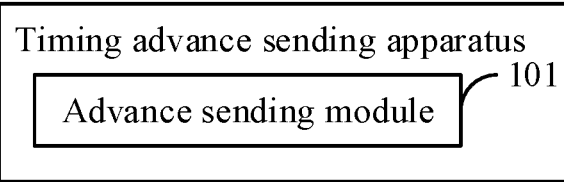
FIG. 8 is a schematic block diagram of a timing advance apparatus shown according to an embodiment of the present disclosure.

The technical solutions in the embodiments of the present disclosure will be clearly and completely described below in conjunction with the accompanying drawings in the embodiments of the present disclosure. Apparently, the described embodiments are only a part of the embodiments of the present disclosure, but not all of the embodiments. Based on the embodiments of the present disclosure, all other embodiments obtained by those of ordinary skill in the art without creative labor shall fall within the protection scope of the present disclosure.

FIG. 1 is a schematic flowchart of a timing advance sending method shown according to an embodiment of the present disclosure. The method shown in this embodiment may be applicable to terminals in a non-terrestrial network (NTN), including but not limited to electronic devices such as mobile phones, tablets, wearable devices, sensors, Internet of Things devices or the like. The terminal can serve as a user device that communicates with a base station, where the base station may be a terrestrial base station in the NTN, or a non-terrestrial network device in the NTN, such as a satellite, non-terrestrial platform or the like. The following is mainly illustrated in the case that the network device is a satellite.

As shown in FIG. 1, the timing advance sending method may include the following steps.

At step S101, a relative timing advance is sent to the base station, where the relative timing advance is determined based on a relationship between the distance from the terminal to a non-terrestrial network device and the distance from the network device to an earth reference point.

In the NTN, it is required to send communication signals to the satellite no matter whether the terminal communicates with the terrestrial base station, or with the satellite serving as the base station. Since the satellite is non-terrestrial, it takes a relatively long time for communication signals to be transmitted to the satellite, resulting in a large propagation delay between the terminal and the base station, even reaching up to 541.46 ms in maximum.

In order to compensate for the propagation delay in the NTN, the terminal can perform compensation based on Timing Advance (TA) in the process of communication, where there are mainly two manners for compensation as follows:

The first manner is that the terminal determines TA autonomously, which is applicable to situations where the terminal can determine its own position. The terminal may calculate the delay to be compensated on the basis of the distance from the terminal to the satellite. This applies to a satellite regenerative mode in which the satellite serves as the base station; or the terminal may calculate the delay to be compensated on the basis of the distance from the terminal to the satellite as well as the distance or delay from the satellite to the base station. This applies when the base station is terrestrial.

The delay to be compensated, which is determined by the terminal, can be used as TA, which may be reported to the base station in a random access process, for example, carried in Msg3 or MsgA (Msg is short for Message) in the random access process. When the terminal communicates with the base station, it may compensate the total TA, or it can first receive the common timing advance broadcast by the network (which can be called common TA), and then perform partial compensation, that is, to compensate the difference between the total TA and the common TA.

The second manner means that the terminal determines TA non-autonomously, which is applicable to situations where the terminal cannot determine its own position. The terminal may receive the common TA broadcast by the network, and then compensates the common TA when communicating with the base station, or the terminal does not compensate the common TA, but instead the network (for example the satellite) performs compensation for the common TA.

For example, the distance from the satellite to an earth reference point is d0, the distance from the satellite to the terminal is d1, the distance from the satellite to the base station is d0_F, and the speed of light is c. In the satellite regenerative mode, the common TA is equal to a round trip delay from the satellite to the earth reference point, specifically equal to 2*d0/c; when the terminal communicates with the terrestrial base station, the common TA is equal to the round trip delay from the satellite to the earth reference point plus the round trip delay from the satellite to the terrestrial base station, specifically equal to 2*(d0+d0_F)/c.

In the related art, the terminal may report the determined TA so that the network learns the propagation delay the terminal requires for compensation. However, the currently reported timing advance is the timing advance of the entire communication link, which may reach up to 541.46 ms in maximum as described above, so that a large number of bits are required to be occupied for indication of the timing advance, causing a large occupation on the communication resources.

In a case where the terminal determines TA non-autonomously, since the propagation delay is compensated according to the common TA broadcast by the network, there is no requirement to report TA to the network as it has already learned the propagation delay the terminal requires for compensation. As such, it requires a large occupation of communication resources if the terminal still reports TA.

According to the embodiments of the present disclosure, the TA reported by the terminal to the base station may not be the TA corresponding to the propagation delay of all communication links, but only a relative TA. The relative TA is determined based on the relationship between the distance from the terminal to a non-terrestrial network device, and the distance from the network device to an earth reference point. For example, it may be determined based on the difference between the distance from the terminal to the non-terrestrial network device and the distance from the network device to the earth reference point. Since the difference between the distance from the terminal to the non-terrestrial network device and the distance from the network device to the earth reference point, is less than a sum of the distance from the terminal to the non-terrestrial network device and the distance from the network device to the earth reference point (i.e., less than the spatial length of the entire communication link), the determined relative TA is also less than the TA corresponding to the propagation delay of all the communication links. Therefore, a number of bits that requires to be occupied is relatively small, and a number of bits that requires to be occupied by the terminal to report the relative TA is thus relatively small, which is beneficial to save communication resources.

In some examples, the relative TA is determined based on the difference between the distance from the terminal to the non-terrestrial network device and the distance from the network device to the earth reference point.

Since the difference between the distance from the terminal to the non-terrestrial network device and the distance from the network device to the earth reference point, is less than the sum of the distance from the terminal to the non-terrestrial network device and the earth reference point, namely the spatial length of the entire the communication link, the relative TA thus determined is less than the TA corresponding to the propagation delay of all the communication links.

It should be noted that, in addition to determining the relative TA on the difference between the distance from the terminal to the non-terrestrial network device and the distance from the network device to the earth reference point, the relative TA may also be determined according to the ratio of the distance from the terminal to the non-terrestrial network device and the distance from the network device to the earth reference point, as long as the relative TA is smaller than the propagation delay of all the communication links between the terminal and the base station. The manner for determining the relative TA can be selected as required, which is not limited to the present disclosure.

In some examples, the relative TA is equal to twice the quotient of the difference between the distance from the terminal to the non-terrestrial network device and the distance from the network device to the earth reference point and the speed of light.

In one embodiment, taking the network device as a satellite for example, the distance from the satellite to the earth reference point is d0, the distance between the satellite and the terminal is d1, and the light speed is c, then the relative TA is equal to $2*(d1-d0) c$. The earth reference point may refer to the projected position of the satellite on the earth.

FIG. 2 is a schematic flowchart of another timing advance sending method shown in accordance with an embodiment of the present disclosure. As shown in FIG. 2, sending the relative TA to the base station includes:

At step S1011, sending Msg3 or MsgA in a random access process to the base station, where the relative TA is carried in the Msg3 or MsgA in the random access process.

In one embodiment, the relative TA may be carried by a random access message sent to the base station in the random access process. For example, in the four-step random access process, the relative TA can be carried by the Msg3 and sent to the base station, and in the two-step random access process, the relative timing advance can be carried by the MsgA and sent to the base station.

In some examples, the Msg3 or MsgA in the random access process contains advance indication information for indicating whether the Msg3 or MsgA contains the relative TA.

In one embodiment, when the Msg3 carries the relative TA, advance indication information can be set in the Msg3, so that after receiving the Msg3, the base station can determine that the relative TA is contained in the Msg3 according to the advance indication information therein.

In one embodiment, when the MsgA carries the relative TA, advance indication information can be set in the MsgA, so that after receiving the MsgA, the base station can determine that the relative TA is contained in the MsgA according to the advance indication information therein.

Further, the advance indication information may further indicate the TA contained in the Msg3 or MsgA, specifically whether the relative TA, or the advance corresponding to the above-mentioned propagation delay of all the communication links.

FIG. 3 is a schematic flowchart of yet another timing advance sending method shown according to an embodiment of the present disclosure. As shown in FIG. 3, sending the relative TA to the base station includes the following:

At step S1012, sending the Physical Uplink Control Channel or Media Access Control Control Element to the base station, where the relative TA is carried in the Physical Uplink Control Channel or Media Access Control Control Element.

In one embodiment, the relative TA may be carried by Physical Uplink Control Channel (PUCCH), or the relative TA may be carried by the Control Element of Media Access Control (MAC CE).

FIG. 4 is a schematic flowchart of yet another timing advance sending method shown according to an embodiment of the present disclosure. As shown in FIG. 4, sending the relative TA to the base station includes the following:

At step S1013, sending the relative TA to the base station in response to the autonomous determination of the TA by the terminal.

In one embodiment, in the case of non-autonomous determination of TA, since the propagation delay is compensated according to the common TA broadcast by the network, the network has already learned how much the terminal requires to compensate for the propagation delay, there is no requirement to report TA to the network. In this case, if TA is still reported, it will cause a waste of communication resources.

Therefore, the relative TA may be sent to the base station only when the terminal determines TA autonomously, while in the case of non-autonomous determination of TA, it may not be required to send the relative TA to the base station so as to avoid waste of communication resources.

FIG. 5 is a schematic flowchart of yet another timing advance sending method shown according to an embodiment of the present disclosure. As shown in FIG. 5, sending the relative TA to the base station includes the following:

At step S1014, in response to not receiving compensation indication information for compensation of the common TA from the base station, sending the relative TA to the base according to the relative TA.

FIG. 6 is a schematic flowchart of another timing advance sending method shown according to an embodiment of the present disclosure. As shown in FIG. 6, sending the relative TA to the base station includes the following:

At step S1015, in response to receiving the compensation indication information for compensation of the common TA from the base station, sending the relative TA to the base station according to the sum of the common TA and the relative TA.

In one embodiment, since the terminal sends the relative TA to the base station, which also belongs to the communication between the terminal and the base station, the action of sending the TA also requires compensating the propagation delay between the base station and the terminal. In order to compensate for the propagation delay, the terminal can compensate all or a part of the propagation delay, while other devices in the network, such as the satellite, can compensate for the other part, and the specific compensation can be determined according to the compensation indication information of the base station.

Without receiving the compensation indication information from the base station, the terminal can determine that it only requires compensating the relative TA, i.e., sending the relative TA to the base station according to the relative TA. Specifically, the terminal can send the relative TA to the base in advance by the amount of the relative TA (namely, the length of advance is equal to the relative TA).

In this case, since the relative TA is not equal to the propagation delay corresponding to all the communication links, a part of the propagation delay requires to be compensated by other devices in the network.

In the case of receiving the compensation indication information for compensating the common TA from the base station, the terminal may determine that it requires to compensate not only the relative TA but also the common TA. Namely, the terminal sends the relative TA to the base station according to the amount of the sum of the common TA and the relative TA. That is, the terminal sends the relative TA to the base station in advance by the amount of the sum of the common TA and the relative TA (i.e., the length of advance is equal to the sum of the common TA and the relative TA).

In this case, the sum of the relative TA and the common TA may be equal to the propagation delay corresponding to all the communication links, or may not be equal to the propagation delay corresponding to all the communication links. If the sum of the relative TA and the common TA is equal to the propagation delay corresponding to all the communication links, it means that the terminal has compensated the propagation delay corresponding to all the communication links, and other devices in the network may not require to compensate for the delay. If the sum of the relative TA and the common TA is not equal to the propagation delay corresponding to all the communication links, other devices in the network can compensate for the other part of the propagation delay.

In some examples, the common TA is calculated by one of the following:

calculating twice the first quotient of the distance from the network device to the earth reference point and the speed of light as the common TA;

calculating twice the second quotient of the distance from the network device to the terrestrial base station and the speed of light as the common TA; and calculating twice a sum of the first quotient and the second quotient as the common TA.

In one embodiment, the common TA for compensation by the network as indicated by the base station may be calculated differently in different cases.

For example, when a satellite is used as a base station (which may be referred to as the satellite regenerative mode), twice the first quotient of the distance from the network device to the earth reference point and the speed of light can be calculated as the common TA, or twice the second quotient of the distance from the network device to the terrestrial base station and the speed of light can be calculated as the common TA. In the case where the base station is a terrestrial base station (which may be referred to as a satellite bent-pipe mode), twice the sum of the first quotient and the second quotient can be calculated as the common TA.

FIG. 7 is a schematic flowchart of yet another timing advance sending method shown according to an embodiment of the present disclosure. As shown in FIG. 7, the method further includes the following:

At step S102, determining a manner for calculating the common TA according to the compensation indication information.

In one embodiment, since there are various manners of calculating the common TA, for example when the satellite is the base station, calculating twice the first quotient of the distance from the network device to the terrestrial reference station and the speed of light as the common TA or calculating twice the second quotient of the distance from the network device to the terrestrial base station and the speed of light as the common TA, then the compensation indication information sent by the base station to the terminal may also indicate which manner of calculation the terminal specifically chooses to calculate the common TA.

In some examples, the number of bits occupied by the relative TA is less than or equal to 8.

In one embodiment, since the relative TA is determined based on the difference between the distance from the terminal to the non-terrestrial network device and the distance from the network device to the earth reference point, and the difference is less than the sum of the distance from the terminal to the non-terrestrial network device and the distance from the network device to the earth reference point (i.e., less than the spatial length of all the communication links), the relative TA that is thus determined is also less than the timing advance corresponding to the propagation delay of all the communication links. For example, if the relative TA is less than or equal to 255 time units, and the time unit may be, for example, 15 ms, then the value of 255 can be indicated by 8 bits.

Corresponding to the aforementioned embodiments of the timing advance sending method, the present disclosure also provides embodiments of a timing advance sending apparatus.

FIG. 8 is a schematic block diagram of a timing advance apparatus shown according to an embodiment of the present disclosure. The apparatus shown in this embodiment may be applicable to terminals in a Non-Territorial Network (NTN), including but not limited to electronic devices such as mobile phones, tablets, wearable devices, sensors, Internet of Things devices, or the like. The terminal may be used as a user device that communicates with a base station, where the base station may be a terrestrial base station in the NTN, or a non-terrestrial network device in the NTN, such as a satellite, a non-terrestrial platform, or the like. The following is mainly illustrated in the case that the network device is a satellite.

As shown in FIG. 8, the timing advance sending apparatus may include the following:

An advance sending module 101 is configured to send relative Timing Advance (TA) to the base station, where the relative TA is determined based on a relationship between the distance from the terminal to the non-terrestrial network device and the distance from the network device to an earth reference point.

In some examples, the relative TA is equal to twice the quotient of the difference between the distance from the terminal to the non-terrestrial network device and the distance from the network device to the earth reference point and the speed of light.

In some examples, the advance sending module is configured to send Msg3 or MsgA in a random access to the base station, where the relative TA is carried in the Msg3 or MsgA in the random access process.

In some examples, the Msg3 or MsgA in the random access process contains advance indication information for indicating whether the relative TA is contained in the Msg3 or MsgA.

In some examples, the advance sending module is configured to send Physical Uplink Control Channel or Media Access Control Control Element to the base station, where the relative TA is carried in the Physical Uplink Control Channel or the Media Access Control Control Element.

In some examples, the advance sending module is configured to send the relative TA to the base station in response to autonomous determination of TA by the terminal.

In some examples, the advance timing sending module is configured to send the relative TA to the base station in advance by the amount of the relative TA, in response to not receiving the compensation indication information for compensation of the common TA from the base station.

In some examples, the advance sending module is configured to send the relative TA to the base station in advance by the amount of the sum of the common TA and the relative TA, in response to receiving the compensation indication information for compensation of the common TA from the base station.

In some examples, the common TA is calculated by one of the following:

calculating twice the first quotient of the distance from the network device to the earth reference point and the speed of light as the common TA;

calculating twice the second quotient of the distance from the network device to the earth reference point and the speed of light as the common TA; and calculating twice the sum of the first quotient and the second quotient as the common TA.

Figure 9:
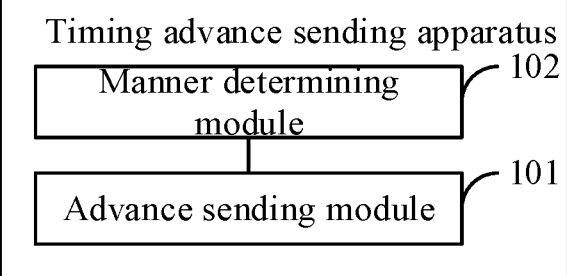
FIG. 9 is a schematic block diagram of another timing advance apparatus shown according to an embodiment of the present disclosure.

FIG. 9 is a schematic block diagram of another timing advance apparatus shown according to an embodiment of the present disclosure. As shown in FIG. 9, the apparatus further includes:

A manner determining module 102 is configured to determine the manner for calculating the common TA according to the compensation indication information.

In some examples, the number of bits occupied by the relative TA is less than or equal to 8.

Regarding the apparatus of the above-described embodiments, the specific manners in which each module performs operations have been described in detail in the embodiments of the relevant methods, and thus are not described in detail here.

For the apparatus embodiments, since they basically correspond to the method embodiments, reference may be made to the partial description of the method embodiments for relevant parts. The apparatus embodiments described above are merely illustrative, where the modules described as separate components may or may not be physically separated, and the components shown as modules may or may not be physical modules, that is, they may be located in one place, or it can be distributed over multiple network modules. Some or all of the modules may be selected according to actual needs to achieve the purpose of the solution in this embodiment. Those of ordinary skill in the art can understand and implement it without exerting any creative labor.

The present disclosure also proposes an electronic device, including:

a processor;

a memory for storing processor-executable instructions;

where the processor is configured to implement the method described in any one of the above embodiments.

The present disclosure also proposes a computer-readable storage medium, on which a computer program that implements the steps in the method described in any one of the above embodiments when executed by a processor.

Figure 10:
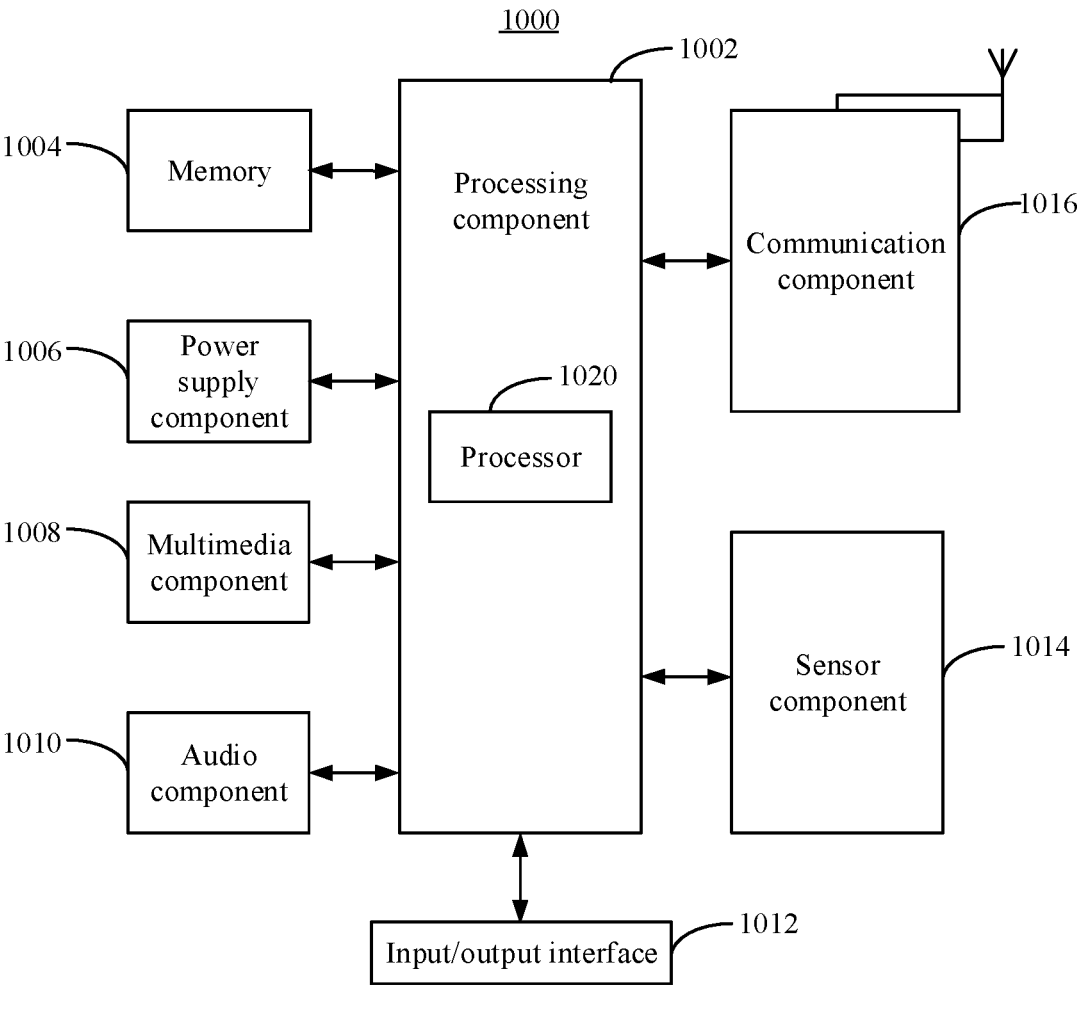
FIG. 10 is a schematic block diagram of an apparatus for sending timing advance shown according to an embodiment of the present disclosure.

FIG. 10 is a schematic block diagram of an apparatus 1000 for sending timing advance, shown in accordance with an embodiment of the present disclosure. For example, the apparatus 1000 may be a mobile phone, a computer, a digital broadcasting terminal, a messaging device, a game console, a tablet, a medical device, a fitness device, a personal digital assistant, or the like.

Referring to FIG. 10, the apparatus 1000 may include one or more components: a processing component 1002, a memory 1004, a power supply component 1006, a multimedia component 1008, an audio component 1010, an input/output (I/O) interface 1012, a sensor component 1014, and a communication component 1016.

The processing component 1002 generally controls the overall operation of the apparatus 1000, such as operations associated with display, telephone calling, data communication, camera operation, and recording operation. The processing component 1002 may include one or more processors 1020 to execute instructions to perform all or part of the steps of the method described above. In addition, the processing component 1002 may include one or more modules to facilitate interaction between the component 1002 and the other components. For example, the processing component 1002 may include a multimedia module to facilitate interaction between the multimedia component 1008 and the processing component 1002.

The memory 1004 is configured to store various types of data to support operation on the apparatus 1000. Examples of such data include instructions for any application or method for operating on the apparatus 1000, contact data, phonebook data, messages, pictures, videos, or the like. The memory 1004 may be implemented by any type of volatile or non-volatile storage device or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), Magnetic Memory, Flash Memory, Magnetic or Optical disk.

The power supply component 1006 provides electrical power to the various components of the apparatus 1000. The power supply component 1006 may include a power management system, one or more power sources, and other components associated with generating, managing, and distributing power for the apparatus 1000.

The multimedia component 1008 includes a screen that provides an output interface between the apparatus 1000 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense the touch, swipe and gestures on the touch panel. The touch sensor may not only sense the boundaries of a touch or swipe action, but also detect the duration and pressure associated with the touch or swipe action. In some embodiments, the multimedia component 1008 includes a front camera and/or a rear-facing camera. When the apparatus 1000 is in an operation mode, such as a shooting mode or a video mode, the front camera and/or the rear camera may receive external multimedia data. Each of the front camera and the rear camera can be a fixed optical lens system or have a focal length and optical zoom capability.

The audio component 1010 is configured to output and/or input audio signals. For example, the audio component 1010 includes a microphone (MIC) that is configured to receive external audio signals when the apparatus 1000 is in an operating mode, such as a calling mode, a recording mode, and a voice recognition mode. The received audio signal may be further stored in the memory 1004 or sent via the communication component 1016. In some embodiments, the audio component 1010 also includes a speaker for outputting audio signals.

The I/O interface 1012 provides an interface between the processing component 1002 and a peripheral interface module, which may be a keyboard, a click wheel, a button, or the like. These buttons may include but are not limited to: a home button, volume buttons, a start button and a lock button.

The sensor component 1014 includes one or more sensors for providing a status assessment of various aspects for the apparatus 1000. For example, the sensor component 1014 may detect an on/off state of apparatus 1000, the relative positioning of components, such as the display and the keypad of the apparatus 1000, and the sensor component 1014 may also detect a change in the position of the apparatus 1000 or a component of the apparatus 1000, the presence or absence of user contact with the apparatus 1000, the apparatus 1000 orientation or acceleration/deceleration and the temperature change of the apparatus 1000. The sensor component 1014 may include a proximity sensor configured to detect the presence of nearby objects in the absence of any physical contact. The sensor component 1014 may also include an optical sensor, such as a CMOS or CCD image sensor, for use in imaging applications. In some embodiments, the sensor component 1014 may also include an acceleration sensor, a gyroscope sensor, a magnetic sensor, a pressure sensor, or a temperature sensor.

The communication component 1016 is configured to facilitate wired or wireless communication between the apparatus 1000 and other devices. The apparatus 1000 may access a wireless network based on a communication standard, such as WiFi, 2G or 3G, 4G LTE, 5G NR, or a combination thereof. In one exemplary embodiment, the communication component 1016 receives broadcast signals or broadcast-related information from an external broadcast management system via a broadcast channel. In one exemplary embodiment, the communication component 1016 also includes a Near-Field Communication (NFC) module to facilitate short-range communication. For example, the NFC module may be implemented based on Radio Frequency Identification (RFID) technology, Infrared Data Association (IrDA) technology, Ultra-Wideband (UWB) technology, Bluetooth (BT) technology, and other technologies.

In an exemplary embodiment, the apparatus 1000 may be implemented by one or more Application Specific Integrated Circuits (ASIC), Digital Signal Processors (DSP), Digital Signal Processing Devices (DSPD), Programmable Logic Devices (PLD), Field Programmable Door Arrays (FPGA), a controller, a micro-controller, a micro-processor, or other electronic elements for performing the above method.

In an exemplary embodiment, there is also provided a non-temporary computer-readable storage medium including instructions, for example, a memory 1004 including instructions that may be executed by the processor 1020 of the apparatus 1000 to complete the above-mentioned method. For example, the non-temporary computer-readable storage medium may be ROM, Random Access Memory (RAM), CD-ROM, magnetic tape, floppy disk, optical data storage device, or the like.

Other embodiments of the present disclosure will readily occur to those skilled in the art upon consideration of the specification and practice of the disclosure disclosed herein. This disclosure is intended to cover any variations, uses, or adaptations of this disclosure that follow the general principles of this disclosure and include common general knowledge or techniques in the technical field not disclosed by this disclosure. The specification and examples are to be regarded as exemplary only, with the true scope and spirit of the disclosure being indicated by the following claims.

It should be understood that the present disclosure is not limited to the precise structures already described above and illustrated in the accompanying drawings, and that a variety of modifications and changes can be made without departing from the scope thereof. The scope of this disclosure is limited only by the appended claims.

It should be noted that in this document, relational terms such as first and second are only used to distinguish one entity or operation from another entity or operation, and do not necessarily require or imply any such actual relationship or sequence between such entities or operations. The terms "comprise," "include," and any other variant thereof is intended to cover non-exclusive inclusion so that a process, method, article, or device comprising a list of elements includes not only those elements, but also other elements not explicitly listed, or other elements inherent to such a process, method, article, or equipment. In the absence of additional restrictions, an element defined by the statement "comprising a . . . " does not preclude the existence of additional identical elements in a process, method, article, or device including the element.

The methods and devices provided by the embodiments of the present disclosure have been described in detail above, and specific examples are used to illustrate the principles and implementations of the present disclosure. At the same time, for those of ordinary skill in the art, according to the idea of the present disclosure, there will be changes in the specific implementation and application scope. In summary, the content of this specification should not be construed as a limitation to the present disclosure.

The invention claimed is:

1. A timing advance sending method, comprising:
sending, by a terminal, first timing advance to a base station, comprising: sending Msg3 or MsgA in a random access process to the base station, wherein the first timing advance is carried in the Msg3 or MsgA in the random access process, the first timing advance is determined based on a relationship between a distance from the terminal to a non-terrestrial network device and a distance from the non-terrestrial network device to an earth reference point, and the Msg3 or MsgA in the random access process contains advance indication information for indicating whether the Msg3 or MsgA contains the first timing advance;
wherein sending the first timing advance to the base station comprises:
in response to not receiving compensation indication information for compensation of common timing advance from the base station, sending the first timing advance to the base station according to the first timing advance; or
in response to receiving compensation indication information for compensation of common timing advance from the base station, sending the first timing advance to the base station according to a sum of the common timing advance and the first timing advance,
wherein the method further comprises: determining a manner for calculating the common timing advance according to the compensation indication information, wherein the compensation indication information indicates a manner for compensating a propagation delay between the base station and the terminal, and indicates a manner for calculating the common timing advance, wherein the common timing advance is calculated by one of followings:
calculating twice a first quotient of the distance from the non-terrestrial network device to the earth reference point and speed of light as the common timing advance;
calculating twice a second quotient of the distance from the non-terrestrial network device to the earth reference point and speed of light as the common timing advance; or
calculating twice a sum of the first quotient and the second quotient as the common timing advance,
wherein the advance indication information is a separate indicator field in the Msg3 or MsgA that is different from the first timing advance contained in the Msg3 or MsgA.

2. The method of claim 1, wherein the first timing advance is equal to twice a quotient of a difference between the distance from the terminal to the non-terrestrial network device and the distance from the non-terrestrial network device to the earth reference point, and speed of light.

3. The method of claim 1, wherein sending the first timing advance to the base station comprises:

sending Physical Uplink Control Channel or Media Access Control Control Element to the base station, wherein the first timing advance is carried in the Physical Uplink Control Channel or the Media Access Control Control Element.

4. The method of claim 1, wherein sending the first timing advance to the base station comprises:

sending the first timing advance to the base station in response to autonomous determination of timing advance by the terminal.

5. The method of claim 1, wherein the first timing advance is determined based on a difference between the distance from the terminal to the non-terrestrial network device and the distance from the non-terrestrial network device to the earth reference point.

6. An electronic device, comprising:

a memory for storing processor-executable instructions;

a processor that is communicatively coupled to the memory, wherein the processor is configured to:

send first timing advance to a base station, comprising:

send Msg3 or MsgA in a random access process to the base station, wherein the first timing advance is carried in the Msg3 or the MsgA in the random access process, the first timing advance is determined based on a relationship between a distance from a terminal to a non-terrestrial network device and a distance from the non-terrestrial network device to an earth reference point, and the Msg3 or the MsgA in the random access process contains advance indication information for indicating whether the Msg3 or the MsgA contains the first timing advance;

wherein when sending the first timing advance to the base station, the processor is further configured to:

in response to not receiving compensation indication information for compensation of common timing advance from the base station, send the first timing advance to the base station according to the first timing advance; or in response to receiving compensation indication information for compensation of common timing advance from the base station, send the first timing advance to the base station according to a sum of the common timing advance and the first timing advance, wherein the processor is further configured to: determine a manner for calculating the common timing advance according to the compensation indication information, wherein the compensation indication information indicates a manner for compensating a propagation delay between the base station and the terminal, and indicates a manner for calculating the common timing advance, wherein the common timing advance is calculated by one of followings:

calculating twice a first quotient of the distance from the non-terrestrial network device to the earth reference point and speed of light as the common timing advance;

calculating twice a second quotient of the distance from the non-terrestrial network device to the earth reference point and speed of light as the common timing advance; or calculating twice a sum of the first quotient and the second quotient as the common timing advance, wherein the advance indication information is a separate indicator field in the msg3 or msgA that is different from the first timing advance contained in the msg3 or msgA.

7. The electronic device of claim 6, wherein the first timing advance is equal to twice a quotient of a difference between the distance from the terminal to the non-terrestrial network device and the distance from the non-terrestrial network device to the earth reference point, and speed of light.

8. The electronic device of claim 6, wherein when sending the first timing advance to the base station, the processor is further configured to:

send Physical Uplink Control Channel or Media Access Control Control Element to the base station, wherein the first timing advance is carried in the Physical Uplink Control Channel or the Media Access Control Control Element.

9. The electronic device of claim 6, wherein when sending the first timing advance to the base station, the processor is further configured to:

send the first timing advance to the base station in response to autonomous determination of timing advance by the terminal.

10. The electronic device of claim 6, wherein the first timing advance is determined based on a difference between the distance from the terminal to the non-terrestrial network device and the distance from the non-terrestrial network device to the earth reference point.

* * * * *